(12) United States Patent
Frenz

(10) Patent No.: US 10,021,520 B2
(45) Date of Patent: *Jul. 10, 2018

(54) USER OR AUTOMATED SELECTION OF ENHANCED GEO-FENCING

(71) Applicant: Honeywell International Inc., Morris Plains, NJ (US)

(72) Inventor: Jonathan P. Frenz, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,543

(22) Filed: Jan. 3, 2017

(65) Prior Publication Data

US 2017/0171707 A1 Jun. 15, 2017

Related U.S. Application Data

(63) Continuation of application No. 14/964,349, filed on Dec. 9, 2015, now Pat. No. 9,560,482.

(51) Int. Cl.
*H04W 52/02* (2009.01)
*H04M 3/42* (2006.01)
(Continued)

(52) U.S. Cl.
CPC ............ *H04W 4/021* (2013.01); *G05B 15/02* (2013.01); *H04M 3/42348* (2013.01);
(Continued)

(58) Field of Classification Search
CPC .. H04M 3/42348; H04W 88/02; H04W 4/021
See application file for complete search history.

(56) References Cited

U.S. PATENT DOCUMENTS 5,317,670 A 5/1994 Elia
6,255,988 B1 7/2001 Bischoff
(Continued)

FOREIGN PATENT DOCUMENTS

AU 2015201441 A1 10/2015
CN 101689327 B 5/2013
(Continued)

OTHER PUBLICATIONS

Balaji et al., "Sentinel: Occupancy Based HVAC Actuation Using Existing WiFi Infrastructure Within Commercial Buildings," SenSys '13, 14 pages, Nov. 11-15, 2015.
(Continued)

*Primary Examiner* — Asghar Bilgrami
(74) *Attorney, Agent, or Firm* — Seager Tufte & Wickhem LLP

(57) ABSTRACT

This disclosure relates to a mobile device that is suitable for detect geofence crossing events. In some instances, the mobile device can detect geofence crossing events using a lower power algorithm or a higher power algorithm. The mobile device may allow a user of the mobile device to specify whether a lower power algorithm or a higher power algorithm is to be used when detecting geofence crossing events. In some instances, the mobile device may automatically change from a lower power algorithm to a higher power algorithm if a predetermined abnormality is found to be present in the detected geofence crossing events. In some instances, the user may be prompted to confirm automatically changing from a lower power algorithm to a higher power algorithm if a predetermined abnormality is found to be present in the detected geofence crossing events.

20 Claims, 9 Drawing Sheets

(51) Int. Cl.
*H04W 4/021* (2018.01)
*G05B 15/02* (2006.01)
*H04W 88/02* (2009.01)

(52) U.S. Cl.
CPC ... *H04W 52/0251* (2013.01); *H04W 52/0254* (2013.01); *H04W 88/02* (2013.01)

(56) References Cited

U.S. PATENT DOCUMENTS

| | | |
|---|---|---|
| 6,356,282 B2 | 3/2002 | Roytman et al. |
| 6,400,956 B1 | 6/2002 | Richton |
| 6,478,233 B1 | 11/2002 | Shah |
| 6,529,137 B1 | 3/2003 | Roe |
| 6,604,023 B1 | 8/2003 | Brown et al. |
| 6,665,613 B2 | 12/2003 | Duvall |
| 6,909,891 B2 | 6/2005 | Yamashita et al. |
| 6,990,335 B1 | 1/2006 | Shamoon et al. |
| 7,083,109 B2 | 8/2006 | Pouchak |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,257,397 B2 | 8/2007 | Shamoon et al. |
| 7,327,250 B2 | 2/2008 | Harvey |
| 7,385,500 B2 | 6/2008 | Irwin |
| D580,801 S | 11/2008 | Takach et al. |
| 7,451,017 B2 | 11/2008 | McNally |
| 7,510,126 B2 | 3/2009 | Rossi et al. |
| 7,571,865 B2 | 8/2009 | Nicodem et al. |
| 7,614,567 B2 | 11/2009 | Chapman, Jr. et al. |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,904,608 B2 | 3/2011 | Price |
| 7,908,211 B1 | 3/2011 | Chen et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,064,935 B2 | 11/2011 | Shamoon et al. |
| 8,065,342 B1 | 11/2011 | Borg et al. |
| 8,095,340 B2 | 1/2012 | Brown |
| 8,115,636 B2 | 2/2012 | Forster |
| 8,115,656 B2 | 2/2012 | Bevacqua et al. |
| 8,125,332 B2 | 2/2012 | Curran et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,232,877 B2 | 7/2012 | Husain |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,301,765 B2 | 10/2012 | Goodman |
| 8,332,055 B2 | 12/2012 | Veillette |
| 8,350,697 B2 | 1/2013 | Trundle et al. |
| 8,386,082 B2 | 2/2013 | Oswald |
| 8,390,473 B2 | 3/2013 | Krzyzanowski et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,531,294 B2 | 9/2013 | Slavin et al. |
| 8,554,374 B2 | 10/2013 | Lunacek et al. |
| 8,554,714 B2 | 10/2013 | Raymond et al. |
| 8,571,518 B2 | 10/2013 | Imes et al. |
| 8,587,445 B2 | 11/2013 | Rockwell |
| 8,626,344 B2 | 1/2014 | Imes et al. |
| 8,630,741 B1 | 1/2014 | Matsuoka et al. |
| 8,648,706 B2 | 2/2014 | Ranjun et al. |
| 8,670,783 B2 | 3/2014 | Klein |
| 8,686,841 B2 | 4/2014 | Macheca et al. |
| 8,718,826 B2 | 5/2014 | Ramachandran et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 8,965,406 B2 | 2/2015 | Henderson |
| 9,026,261 B2 | 5/2015 | Bukhin et al. |
| 9,033,255 B2 | 5/2015 | Tessier et al. |
| 9,055,475 B2 * | 6/2015 | Lacatus ............... H04W 24/08 |
| 9,071,453 B2 | 6/2015 | Shoemaker et al. |
| 9,113,298 B2 | 8/2015 | Qiu |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,545 B2 | 12/2015 | Sabatelli et al. |
| 9,215,560 B1 * | 12/2015 | Jernigan ............... H04W 4/021 |
| 9,219,983 B2 | 12/2015 | Sheshadri et al. |
| 9,247,378 B2 | 1/2016 | Bisson et al. |
| 9,288,620 B2 | 3/2016 | Menendez |
| 9,292,022 B2 | 3/2016 | Ramachandran et al. |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,636 B2 | 6/2016 | Ganesh et al. |
| 9,363,772 B2 | 6/2016 | Burks |
| 9,414,422 B2 | 8/2016 | Belghoul et al. |
| 9,432,807 B2 | 8/2016 | Kern, Jr. et al. |
| 9,433,681 B2 | 9/2016 | Constein et al. |
| 9,449,491 B2 | 9/2016 | Sager et al. |
| 9,477,239 B2 | 10/2016 | Bergman et al. |
| 9,489,062 B2 | 11/2016 | Corcoran et al. |
| 9,495,866 B2 | 11/2016 | Roth et al. |
| 9,521,519 B2 | 12/2016 | Chiou et al. |
| 9,552,002 B2 | 1/2017 | Sloo et al. |
| 9,560,482 B1 | 1/2017 | Frenz |
| 9,589,435 B2 | 3/2017 | Finlow-Bates |
| 9,594,384 B2 | 3/2017 | Bergman et al. |
| 9,618,227 B2 | 4/2017 | Drew |
| 9,628,951 B1 | 4/2017 | Kolavennu et al. |
| 9,674,658 B2 | 6/2017 | Partheesh et al. |
| 2002/0147006 A1 | 10/2002 | Coon et al. |
| 2005/0172056 A1 | 8/2005 | Ahn |
| 2006/0063522 A1 | 3/2006 | McFarland |
| 2006/0097063 A1 | 5/2006 | Zeevi |
| 2007/0037605 A1 | 2/2007 | Logan |
| 2007/0099626 A1 | 5/2007 | Lawrence et al. |
| 2007/0114295 A1 | 5/2007 | Jenkins |
| 2007/0249319 A1 | 10/2007 | Faulkner et al. |
| 2008/0094230 A1 | 4/2008 | Mock et al. |
| 2010/0034386 A1 | 2/2010 | Choong et al. |
| 2010/0081375 A1 | 4/2010 | Rosenblatt et al. |
| 2010/0127854 A1 | 5/2010 | Helvick et al. |
| 2010/0156628 A1 | 6/2010 | Ainsbury et al. |
| 2010/0261465 A1 | 10/2010 | Rhoads et al. |
| 2011/0153525 A1 | 6/2011 | Benco et al. |
| 2012/0172027 A1 | 7/2012 | Partheesh et al. |
| 2012/0191257 A1 | 7/2012 | Corcoran et al. |
| 2012/0209730 A1 | 8/2012 | Garrett |
| 2012/0259466 A1 | 10/2012 | Ray et al. |
| 2012/0284769 A1 | 11/2012 | Dixon et al. |
| 2013/0073094 A1 | 3/2013 | Knapton et al. |
| 2013/0225196 A1 | 8/2013 | James et al. |
| 2013/0231137 A1 | 9/2013 | Hugie et al. |
| 2013/0310053 A1 * | 11/2013 | Srivastava ............ H04W 4/021 455/446 |
| 2013/0318217 A1 | 11/2013 | Imes et al. |
| 2014/0156087 A1 | 6/2014 | Amundson |
| 2014/0164118 A1 | 6/2014 | Polachi |
| 2014/0172176 A1 | 6/2014 | Deilmann et al. |

(56) References Cited

U.S. PATENT DOCUMENTS

| | | | |
|---|---|---|---|
| 2014/0200718 A1 | 7/2014 | Tessier | |
| 2014/0302879 A1* | 10/2014 | Kim | H04W 52/0225 455/457 |
| 2014/0330435 A1 | 11/2014 | Stoner et al. | |
| 2014/0337123 A1 | 11/2014 | Nuernberg et al. | |
| 2014/0370911 A1 | 12/2014 | Gorgenyi et al. | |
| 2015/0023502 A1* | 1/2015 | Li | H04W 4/021 380/270 |
| 2015/0094860 A1 | 4/2015 | Finnerty et al. | |
| 2015/0140994 A1 | 5/2015 | Partheesh et al. | |
| 2015/0141045 A1 | 5/2015 | Qiu et al. | |
| 2015/0163631 A1 | 6/2015 | Quam et al. | |
| 2015/0163945 A1 | 6/2015 | Barton et al. | |
| 2015/0186497 A1 | 7/2015 | Patton et al. | |
| 2015/0237470 A1* | 8/2015 | Mayor | H04W 4/021 455/456.2 |
| 2015/0269531 A1* | 9/2015 | Menayas | G06F 3/04812 705/7.18 |
| 2015/0271638 A1 | 9/2015 | Menayas et al. | |
| 2015/0301543 A1 | 10/2015 | Janoso et al. | |
| 2016/0057572 A1 | 2/2016 | Bojorquez Alfaro et al. | |
| 2016/0142872 A1 | 5/2016 | Nicholson et al. | |
| 2016/0223998 A1 | 8/2016 | Songkakul et al. | |
| 2016/0261424 A1* | 9/2016 | Gamberini | G05B 15/02 |
| 2016/0266258 A1* | 9/2016 | Huang | G01S 19/34 |
| 2016/0286033 A1 | 9/2016 | Frenz et al. | |
| 2016/0313749 A1 | 10/2016 | Frenz | |
| 2016/0313750 A1 | 10/2016 | Frenz et al. | |
| 2017/0130979 A1 | 5/2017 | Kolavennu et al. | |
| 2017/0134214 A1 | 5/2017 | Sethuraman et al. | |
| 2017/0171704 A1 | 6/2017 | Frenz | |

FOREIGN PATENT DOCUMENTS

| | | |
|---|---|---|
| EP | 1515289 A1 | 3/2005 |
| EP | 2675195 A2 | 12/2013 |
| MX | 2012000906 A | 9/2012 |
| WO | 2009034720 A1 | 3/2009 |
| WO | 2009036764 A2 | 3/2009 |
| WO | 2009067251 A1 | 5/2009 |
| WO | 2011011404 A1 | 1/2011 |
| WO | 2012000107 A1 | 1/2012 |
| WO | 2013170791 A1 | 11/2013 |
| WO | 2014016705 A2 | 1/2014 |
| WO | 2014047501 A1 | 3/2014 |
| WO | 2014144323 A1 | 9/2014 |
| WO | 2014197320 A1 | 12/2014 |
| WO | 2014200524 A2 | 12/2014 |

OTHER PUBLICATIONS

"Petition for Inter Partes Review of U.S. Pat. No. 8,571,518 Pursuant to 35 U.S.C. 311-319, 37 CFR 42," Inventor Imes et al., dated Oct. 29, 2014.

U.S. Appl. No. 15/048,902, filed Feb. 19, 2016.

Do, "Programmable Communicating Thermostats for Demand Response in California," DR ETD Workshop, 26 pages, Jun. 11, 2007.

Green, "PM's Thermostat Guide," Popular Mechanics, pp. 155-158, Oct. 1985.

Gupta et al., "Adding GPS-Control to Traditional Thermostats: An Exploration of Potential Energy Savings and Design Challenges," Pervasive, LNCS 5538, pp. 95-114, 2009.

Gupta, "A Persuasive GPS-Controlled Thermostat System," 89 pages, Sep. 2008.

http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.

http://stackoverflow.com/questions/14232712/tracking-multiple-20-locations-with-ios-geofencing, "Tracking Multiple (20 +) Locations with iOS Geofencing—Stack Overflow," 2 pages, printed Oct. 29, 2014.

http://www.allure-energy.com/aenf_jan9_12.html, "CES Gets First Look at EverSense," Allure Energy, 2 pages, printed Feb. 17, 2015.

http://IWww.prnev.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.

Mobile Integrated Solutions, LLC, "MobiLinc Take Control of Your Home, MobiLinc and Geo-Fence Awareness," 9 pages, downloaded Mar. 27, 2015.

Pan et al., "A Framework for Smart Location-Based Automated Energy Controls in a Green Building Testbed," 6 pages, downloaded Jan. 30, 2015.

SmartThings Inc., "2 Ecobee Si Thermostat + Geofencing," 17 pages, downloaded Nov. 3, 2014.

* cited by examiner

80

We've noticed things might not be right!

We've noticed that your geofencing experience doesn't seem to be as good as it should be.

If you agree, we'll do our best to improve your experience by using slightly more power hungry methods of location determination. As a result, your phone may burn through battery slightly faster. If this becomes a concern, you can always change this settings in the Geofencing Settings menu.

Yes, improve geofencing

No, thank you

FIG. 8

USER OR AUTOMATED SELECTION OF ENHANCED GEO-FENCING

This is a continuation of co-pending U.S. patent application Ser. No. 14/964,349, filed Dec. 9, 2015, and entitled "USER OR AUTOMATED SELECTION OF ENHANCED GEO-FENCING", which is incorporated herein by reference.

TECHNICAL FIELD

The disclosure relates generally to building automation, and more particularly to building automation systems with geo-fencing capabilities.

BACKGROUND

Building automation systems are often used to control safety, security and/or comfort levels within a building or other structure. Illustrative but non-limiting examples of building automation systems include Heating, Ventilation and/or Air Conditioning (HVAC) systems, security systems, lighting systems, fire suppression systems and/or the like. In some cases, a building automation system may enter an unoccupied mode when the building is expected to be unoccupied and an occupied mode when the building is expected to be occupied. For example, when the building automation system includes an HVAC system, the building automation system may set a temperature set point of the HVAC system to a more energy efficient setting when in an unoccupied mode and a more comfortable setting when in an occupied mode. In another example, when the building automation system includes a security system, the building automation system may set the security system to a locked or away state when in an unoccupied mode and an unlocked or home state when in an occupied mode.

SUMMARY

The present disclosure pertains generally to geo-fencing and, more particularly, to improvements in the accuracy and robustness of geo-fencing. An example of the disclosure may be found in a mobile device with a display, a memory and location services. The mobile device may store information pertaining to a geofence in the memory. With the aid of the location services of the mobile device, a geofence crossing may be detected when the mobile device crosses the geo-fence and, if a geofence crossing is detected, the mobile device may transmit a geofence crossing event to a remote location such as a remote server via a transmitter of the mobile device. The mobile device may detect the geofence crossing events using different algorithms. The different algorithms can use the same or different locations services hardware and/or may include different algorithm settings. The different algorithms may include a lower power algorithm and a higher power algorithm, wherein a lower power algorithm consumes less power from the mobile device than a higher power algorithm. In some cases, the mobile device may allow a user of the mobile device to specify whether a lower power algorithm or a higher power algorithm is to be used when detecting geofence crossing events. In some cases, the mobile device may, sometimes with permission from the user, automatically change from a lower power algorithm to a higher power algorithm if a predetermined abnormality is found to be present in the detected geofence crossing events. In some instances, such functionality may be programmed into the mobile device by an executable program stored on a non-transitory computer-readable storage medium.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

FIG. 8 is an illustrative query that may be displayed on the mobile device soliciting information from the user of the mobile device regarding whether the user of the mobile device would like to improve geofencing or not improve geofencing.

DESCRIPTION

Figure 1:
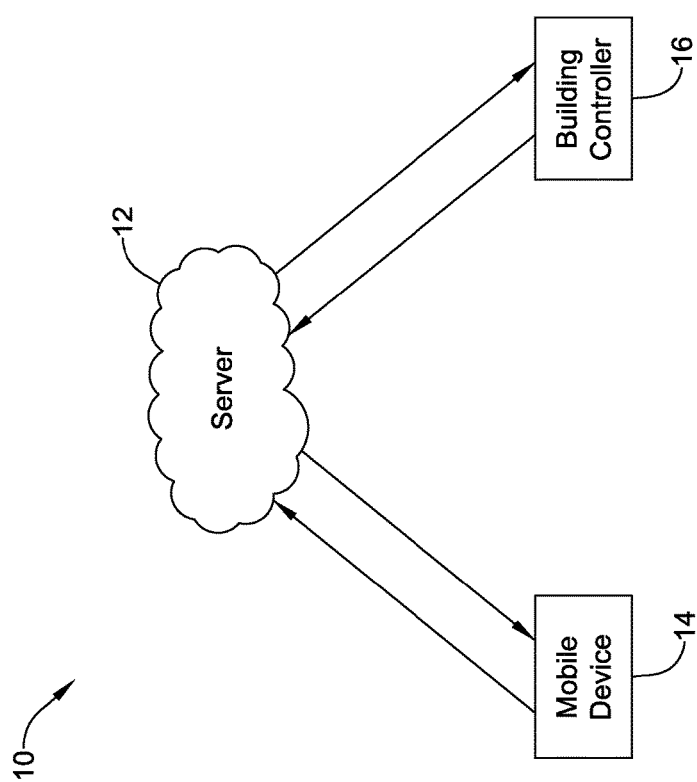
FIG. 1 is a schematic view of an illustrative building automation system.

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and/or any other suitable systems. While HVAC systems are used as an example below, it should be recognized that the concepts disclosed herein can be applied to building control systems more generally.

A building automation system may include a controller, computer and/or other processing equipment that is configured to control one or more features, functions, systems or sub-systems of a building. In some cases, devices that can be used by individuals to communicate with the controller, computer and/or other processing equipment. In some cases, a building automation system may include a plurality of components that, in combination, perform or otherwise provide the functionality of the building automation system. A building automation system may be fully contained within a single building or may include components that are spread between multiple housings and/or across multiple locations. In some embodiments, a building automation system, regardless of the physical location(s) of the components within the building automation system, may control one or more building systems within a single building. In some cases, a building automation system, regardless of the physical location(s) of the components within the building automation system, may control one or more building systems within a plurality of buildings, optionally in accordance with a common operating procedure and/or distinct operating procedures for each building as desired.

FIG. 1 is a schematic view of an illustrative building automation system 10. The illustrative building automation system 10 includes a server 12 that may be configured to communicate with a mobile device 14 and with a building controller 16. It will be appreciated that for simplicity, only a single mobile device 14 is shown, while in many cases the server 12 may be configured to communicate directly or indirectly with any number of mobile devices 14. Similarly, while a single building controller 16 is illustrated, in many cases the server 12 may be configured to communicate directly or indirectly with any number of building controllers 16, located in a single building or distributed throughout a plurality of buildings. The server 12 is illustrated as a single, cloud-based server. In some cases, the server 12 may be a single server. In some instances, the server 12 may generically represent two, three or more servers commonly located or spread between two or more physical locations. In some cases, the server 12 handles communication with both the mobile device 14 and the building controller 16. In some instances, as shown for example in FIG. 2, distinct servers may carry out each communications protocol if desired.

In some cases, the mobile devices 14 may communicate with the server 12 at least partially through a network such as the Internet, sometimes using a cell phone network, WiFi network and/or any other suitable network. Likewise, it is contemplated that the building controller 16 may communicate with the server 12 at least partially through a network such as the Internet, sometimes using a cell phone network, WiFi network and/or any other suitable network. In some cases, the mobile device 14 may be a smartphone, a smart watch, a smart ring, a tablet computer, a laptop computer and/or any other suitable device.

Figure 2:
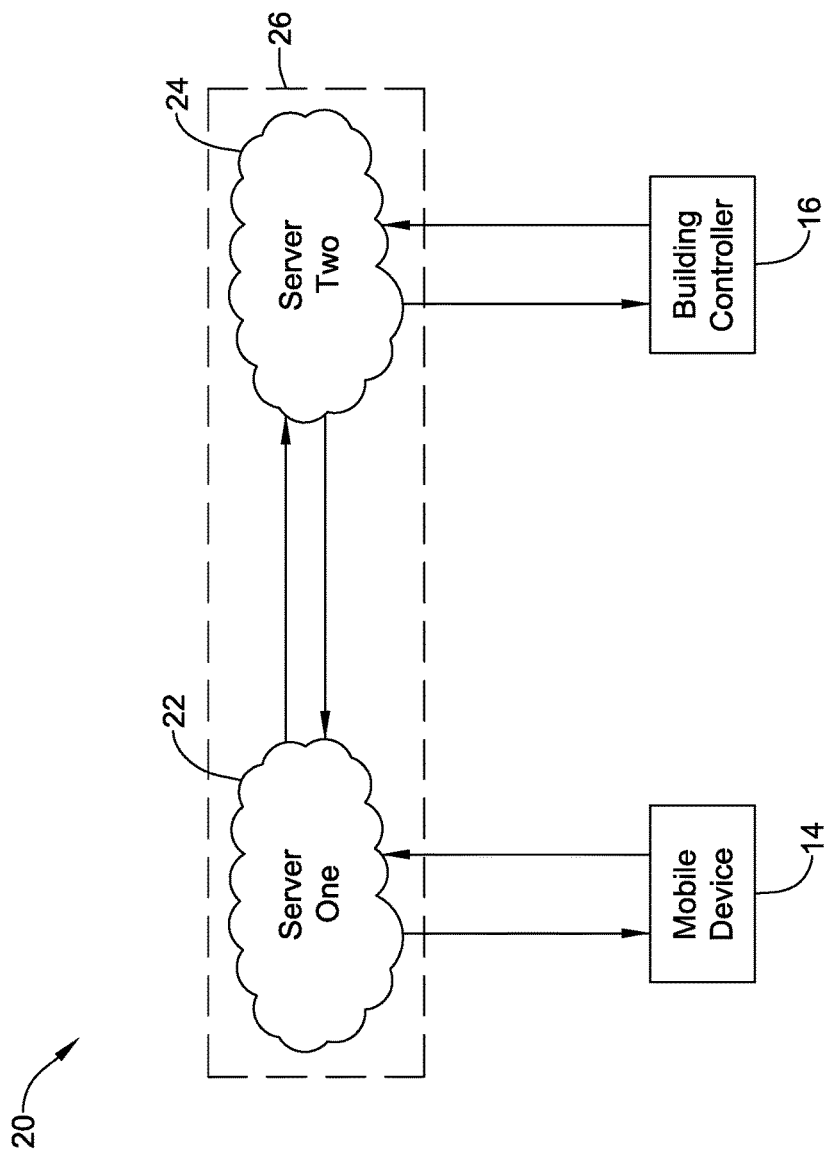
FIG. 2 is a schematic view of another illustrative building automation system.

FIG. 2 is a schematic illustration of another illustrative building automation system 20. The illustrative building automation system 20 includes a first server 22 that may be configured to communicate with a mobile device 14 (or multiple mobile devices 14) and a second server 24 that may be configured to communicate with a building controller 16 (or multiple building controllers 16). The first server 22 may be configured to receive data from the mobile device 14, process the data, and send data to the mobile device 14 and/or to the second server 24. The second server 24 may be configured to receive data from the first server 22 and/or the building controller 16, process the data, and send data to the building controller 16 and/or to the first server 22. In some instances, the first server 22 may be configured to permit data from the mobile device 14 to pass directly through to the building controller 16. In some cases, the second server 24 may be configured to permit data from the building controller 16 to pass directly through to the mobile device 14. The first server 22 and the second server 24 may be configured to communicate with each other. In some cases, each of the first server 22 and the second server 24 may perform a defined function.

It will be appreciated that for simplicity, only a single mobile device 14 is shown, while in many cases the first server 22 may be configured to communicate directly or indirectly with any number of mobile devices 14. Similarly, while a single building controller 16 is illustrated, in many cases the second server 24 may be configured to communicate directly or indirectly with any number of building controllers 16, located in a single building or distributed throughout a plurality of buildings.

The first server 22 is illustrated as a single, cloud-based server. In some cases, the first server 22 may be a single server. In some instances, the first server 22 may generically represent two, three or more servers commonly located or spread between two or more physical locations. The second server 24 is illustrated as a single, cloud-based server. In some cases, the second server 24 may be a single server. In some instances, the second server 24 may generically represent two, three or more servers commonly located or spread between two or more physical locations. In some cases, the first server 22 and the second server 24 may, in combination, be considered as representing or forming a building automation server 26.

Figure 3:
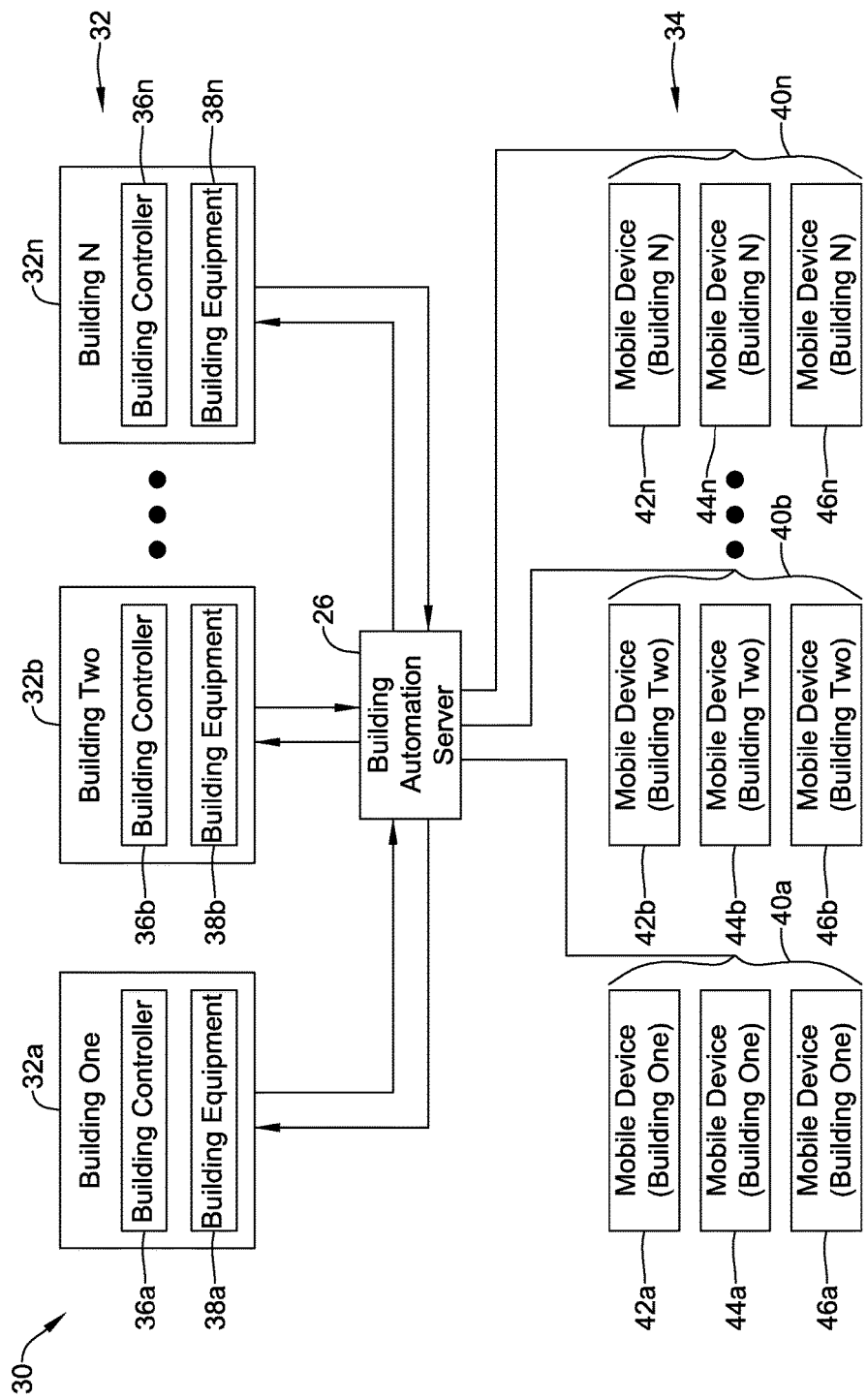
FIG. 3 is a schematic view of another illustrative building automation system.

FIG. 3 is a schematic illustration of a building automation system 30 in which a building automation server 26 is configured to communicate with a plurality of buildings 32 as well as a plurality of mobile devices 34. It is contemplated that the building automation server 26 may include a single server or two or more distinct servers at one or several locations. The building automation system 30 may serve any desired number of buildings. As illustrated, the plurality of buildings 32 includes a Building One, labeled as 32A, a Building Two, labeled as 32B, and so on through a Building "N", labeled as 32N. It will be appreciated that the building automation system 30 may include a large number of buildings, each in communication with a central (or distributed) building automation server 26. In some cases, each building may be associated with a unique customer account, as further described below.

As illustrated, each of the plurality of buildings 32 includes a building controller and one or more pieces of building equipment. The building equipment may, for example, be HVAC equipment, security equipment, lighting equipment, fire suppression equipment, and/or the like. In particular, the building 32A includes a building controller 36A and building equipment 38A, the building 32B includes a building controller 36B and building equipment 38B, and so on through the building 32N, which includes a building controller 36N and building equipment 38N. It will be appreciated that while each building is illustrated as having a single building controller and single building equipment controlled by the single building controller, in some cases a building may have multiple related or unrelated building controllers and/or multiple pieces of related or unrelated building equipment.

The plurality of mobile devices 34 may be considered as being divided into a set of mobile devices each associated with a corresponding building. In the example shown, the plurality of mobile devices 34 may be considered as being divided into a set of mobile devices 40A that are associated with the building 32A, a set of mobile devices 40B that are associated with the building 32B, and so on through a set of mobile devices 40N that are associated with the building 32N. As illustrated, the set of mobile devices 40A includes a first mobile device 42A, a second mobile device 44A and a third mobile device 46A. The set of mobile devices 40B includes a first mobile device 42B, a second mobile device 44B and a third mobile device 46B and so on through the set of mobile devices 40N, which includes a first mobile device 42N, a second mobile device 44N and a third mobile device 46N. This is merely illustrative, as any number of mobile devices, such as smartphones or tablets, may be associated with a particular building as desired. Each user or occupant of a building may have an associated mobile device or may have several associated mobile devices. In some cases, a user or occupant may have a mobile device associated with several different locations such as a home, a cabin or a place of work.

Associating a mobile device with a particular building generally involves the individual who uses the particular mobile device. In the example shown in FIG. 3, a mobile device can communicate with the building automation server 26 and may cause the building automation server 26 to provide instructions to the building controller that is associated with the particular mobile device. For example and, in some instances, a mobile phone with location services activated can be used to inform the building automation server 26 as to the whereabouts of the user relative to a geofence defined for the associated building, and in some cases an estimate of how long before the user will arrive at the associated building. The building automation server 26 may send a command to the building controller of the associated building to operate the building equipment in an energy savings manner when all of the users that are associated with a particular building are determined to be away from the building (e.g. the building is unoccupied). The building automation server 26 may send a command to the building controller of the associated building to operate the building equipment in a comfort mode when all of the users that are associated with a particular building are determined or deemed not to be away from the building (e.g. the building is occupied).

Figure 4:
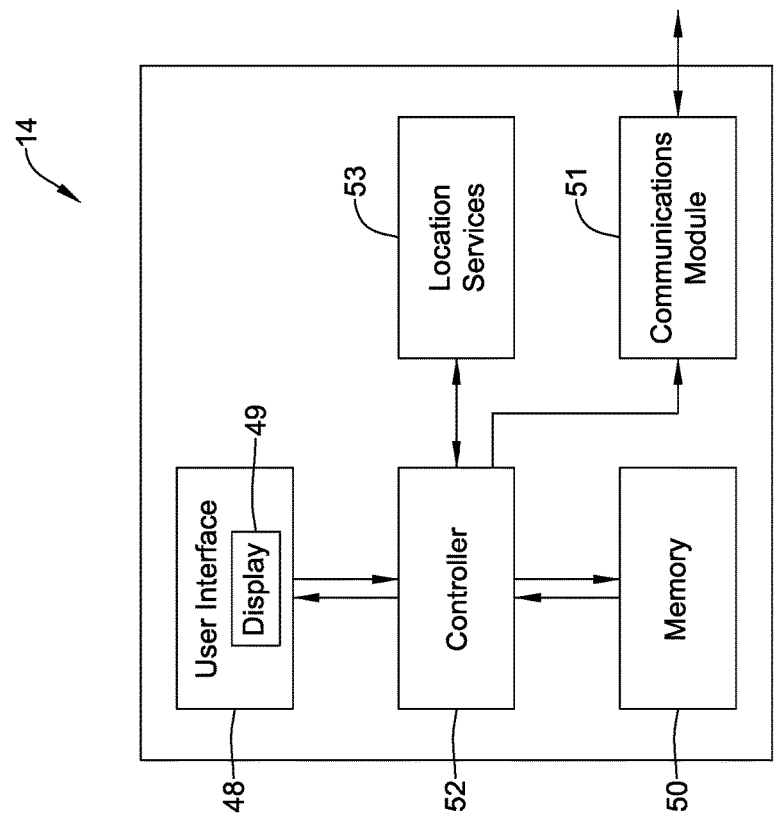
FIG. 4 is a schematic view of an illustrative mobile device.

FIG. 4 is a schematic diagram of the illustrative mobile device 14, as previously referenced in FIGS. 1 and 2. The illustrative mobile device 14 has location services 53 for determining a location of the mobile device 14, and includes a user interface 48 with a display 49, a memory 50, a communications module 51, and a controller 52 that is operably coupled to the user interface 48, the memory 50 and the communications module 51. The location services 53 may include, for example, cellular triangulation (CT), Global Position System (GPS), WiFi Based Positioning (WPS), and/or any other suitable location service. The communications module 51 may include a wired and/or wireless transceiver. In some cases, the communications module 51 may communicate using cellular communication, WiFi communication, Bluetooth communication, Zigbee communication, WiMax communication, and/or any other suitable communication protocol or system as desired. It is contemplated that the memory 50 may be a non-transitory computer-readable storage medium, and in some cases a non-volatile memory.

In some cases, the memory 50 may be configured to store an executable program as well as information pertaining to a geofence that is assigned to a building that is associated with the mobile device 14. In some instances, the memory 50 may also store a geofence log that logs one or more detected geofence crossing events. In some cases, the controller 52 may be configured to upload the geofence log to a remote server, such as the building automation server 26 (FIGS. 2 and 3) from time to time, upon request, or in response to a detected event.

In some instances, with the aid of the location services 53, the controller 52 of the mobile device 14 may detect a geofence crossing when the mobile device 14 crosses a geofence that is assigned to the building associated with the mobile device 14. The mobile device 14 may detect the geofence crossing events using different algorithms. The different algorithms can use the same or different location services hardware and/or may include different algorithm settings. The different algorithms may consume different power levels from the mobile device 14. In some cases, the mobile device may select between a lower power algorithm and a higher power algorithm, wherein a lower power algorithm consumes less power from the mobile device 14 than a higher power algorithm.

In one example, in a lower power algorithm, the location services 53 of the mobile device 14 may use cellular triangulation (CT) when detecting geofence crossing events, and may not use the more power hungry Global Position System (GPS) hardware at all. In a higher power algorithm, the location services 53 of the mobile device 14 may use the more power hungry Global Position System (GPS) hardware exclusively and continuously to detect geofence crossing events.

The mobile device adopts other algorithms with varying power levels. In one example, to reduce the power consumption of the higher power algorithm described above, the mobile device 14 may adopt an algorithm that does not continuously activate the more power hungry Global Position System (GPS) hardware to detect geofence crossing events. Instead, the algorithm may temporarily activate the Global Position System (GPS) hardware to determine if a geofence crossing event has occurred. In some cases, the Global Position System (GPS) hardware may be activated at a certain maximum sample rate, such as 1 reading per minute, 1 reading per 5 minutes, or any other suitable sample rate. In some cases, the sample rate may be set by the mobile device 14 based on the distance that the mobile device 14 is from the geofence, with an increasing sample rate as the mobile device 14 gets closer to the geofence. In some cases, the algorithm may activate the Global Position System (GPS) hardware for a longer or a shorter period of time during each GPS sample to increase or decrease the horizontal accuracy, or HDOP, of the GPS reading. A longer sample period may result in a higher accuracy reading, but will consume more power.

In another example algorithm, the location services 53 of the mobile device 14 may use cellular triangulation (CT) or WPS to initially detect a geofence crossing event and then temporarily activate the more power hungry Global Position System (GPS) hardware to confirm/deny the initially detected geofence crossing event. This algorithm may be higher power than the algorithm described above that does not use the Global Position System (GPS) hardware at all, but may be lower power than the algorithm that uses the Global Position System (GPS) hardware exclusively and continuously to detect geofence crossing events.

In another example algorithm, the location services 53 of the mobile device 14 may use cellular triangulation (CT) or WPS to detect a geofence crossing event, and when the cell tower detects that the user is moving, to then activate the more power hungry GPS more frequently, for example, such as 1 reading per minute, 1 reading per 5 minutes, or any other suitable sample rate.

In some cases, and to reduce the power consumption, not every initially detected geofence crossing event may be confirmed/denied by the Global Position System (GPS) hardware. Instead, the algorithm may only confirm/deny the initially detected geofence crossing events at a maximum confirm/deny rate of once per minute, once per five minutes, or any other suitable maximum confirm/deny rate. Thus, if the cellular triangulation (CT) or WPS detects a series of initially detected geofence crossing events close in time (e.g. due to a low horizontal accuracy of the cellular triangulation), the algorithm may temporarily activate the more power hungry Global Position System (GPS) hardware to confirm/deny only some of the initially detected geofence crossing events, such as one every minute, one every five minutes, or the like. In some cases, the Global Position System (GPS) hardware may be activated for a longer or shorter time period when confirming/denying an initially detected geofence crossing event to increase or decrease the horizontal accuracy, or HDOP, of the GPS reading.

As can be seen from these examples, the mobile device 14 may adopt a wide variety of algorithms that span across a wide range of power consumption levels. In some cases, the mobile device 14 may allow a user of the mobile device 14 to specify whether a lower power algorithm or a higher power algorithm is to be used when detecting geofence crossing events. In some cases, the mobile device may, sometimes with permission from the user, automatically change from a lower power algorithm to a higher power algorithm if a predetermined abnormality is found to be present in the detected geofence crossing events. In some instances, such functionality may be programmed into the mobile device 14 by an executable program stored on a non-transitory computer-readable storage medium.

Figure 5:
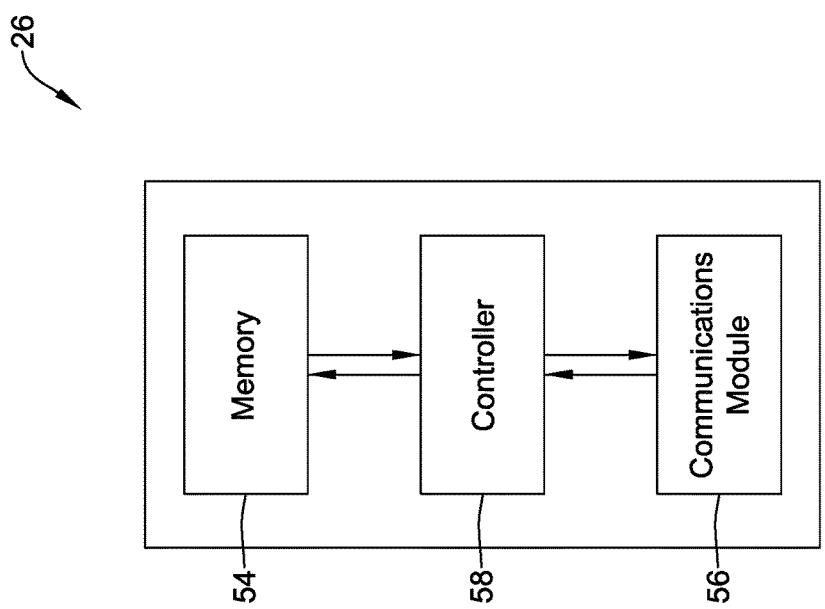
FIG. 5 is a schematic view of an illustrative building automation server.

FIG. 5 is a schematic view of an illustrative building automation server 26, as previously referenced in FIGS. 2 and 3. The building automation server 26 may be configured for servicing a user's building and, in some cases, other buildings as well. The building automation server 26 may include a memory 54, a communications module 56 and a controller 58 that is operably coupled to the memory 54 and to the communications module 56. The memory 54 may be configured for storing a geofence that defines a region about a user's building, and in some cases a log of geofence crossing events received from the user's mobile device. The memory may be RAM memory, optical storage, hard disk storage, and/or any other suitable memory.

The communications module 56 may be configured to communicate with the user's mobile device 14. For example, the communications module 56 may receive geofence crossing events from a user's mobile device 14. In some cases, a geofence crossing event includes a geofence crossing type of inbound or outbound, a timestamp, and/or any other suitable information. In some cases, the communications module 56 of the building automation server 26 may also send information to the user's mobile device 14. In some instances, this information may include whether a predetermined abnormality is suspected and/or present in the detected geofence crossing events, an adjusted geofence size, and/or any other suitable information.

The communications module 56 of the building automation server 26 may also be configured to communicate with an HVAC controller that is controlling an HVAC system within the user's building. The building automation server 26 may send one or more commands to the HVAC controller such that the HVAC controller controls the HVAC system based at least in part in accordance with the detected geofence crossing events. For example, the building automation server 26 may send a command that causes the HVAC controller to enter a more energy efficient away mode (e.g. unoccupied mode) when an outbound geofence crossing event is detected, and to enter a more comfortable home mode (e.g. occupied mode) when an inbound geofence crossing event is detected. This is just one example.

In some cases, the mobile device 14 (see FIG. 4) may be configured to store the geofence associated with the building and to identify when the mobile device 14 crosses the geofence. The communications module 56 of the building automation server 26 may be configured to receive the indications of the geofence crossing events from the mobile device 14 and store them in the memory 54, sometimes in a geofence crossing log. In some cases, the memory 54 may be configured to store a plurality of logs each associated with a corresponding mobile device 14, and the controller 58 may be configured to analyze the plurality of logs to determine if a predetermined abnormality is suspected and/or present. If a predetermined abnormality is suspected and/or present, the controller 58 may communicate the suspected abnormality to the mobile device via the communications module 56. Alternatively, or in addition, some or all of the geofence crossing events may be analyzed by the mobile device 14 rather than the building automation server 26.

In some cases, the mobile device 14 may execute an executable program stored in memory 50 that is configured to instruct the mobile device 14, having a user interface 48 with a display 49 and location services 53, to store information pertaining to a geofence defined by a size about a location, and with the aid of the location services 53 of the mobile device 14, to detect a geofence crossing when the mobile device 14 crosses the geofence, and if a geofence crossing is detected, transmit a geofence crossing event to a remote location, such as a remote building automation server 26. In some cases, the detection of the geofence crossing uses either a lower power algorithm or a higher power algorithm, wherein the lower power algorithm consumes less power from the mobile device 14 than the higher power algorithm. In some cases, a user is allowed to specify via the user interface 48 of the mobile device 14 whether a lower power algorithm or a higher power algorithm is to be used when detecting geofence crossing events, and then the mobile device 14 may adapt to such a lower power or a higher power algorithm when detecting subsequent geofence crossings.

In some cases, a lower power algorithm uses cell tower triangulation of the location services 53 of the mobile device 14, and a higher power algorithm uses the GPS of the location services 53 of the mobile device 14. In some cases, the algorithm uses cell tower triangulation and the GPS of the location services 53 of the mobile device 14, as described above.

In some cases, a lower power algorithm uses the GPS of the location services 53 of the mobile device 14 where the GPS is turned on and sampled at a first rate, and a higher power algorithm uses the GPS of the location services 53 of the mobile device 14 where the GPS is turned on and sampled at a second higher rate.

In some cases, the lower power algorithm and the higher power algorithm may both use the GPS of the location services 53 of the mobile device 14, wherein the lower power algorithm turns the GPS on less often than the higher power algorithm.

In some cases, the lower power algorithm and the higher power algorithm both use the GPS of the location services 53 of the mobile device 14, and the lower power algorithm obtains a less precise GPS location than the higher power algorithm.

Figure 9:
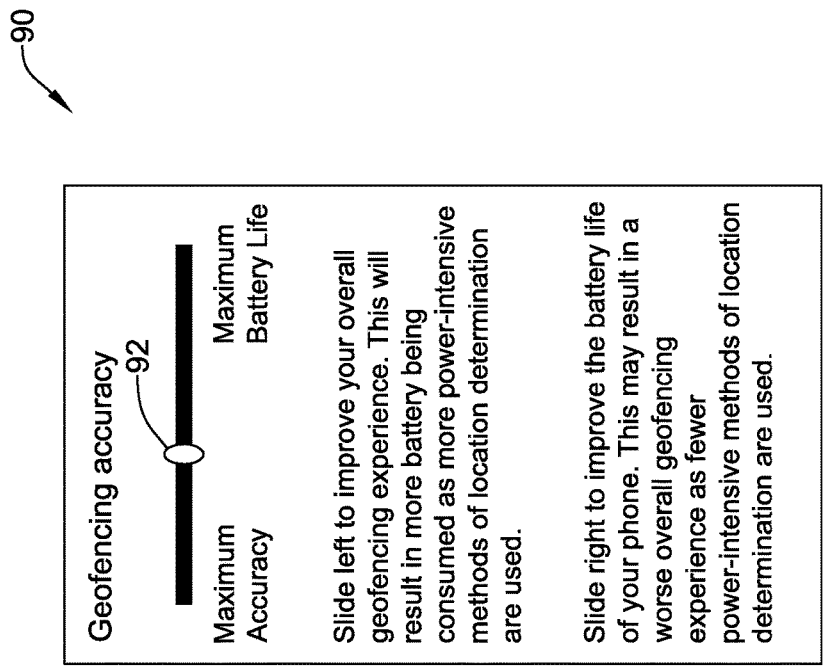
FIG. 9 is an illustrative query allowing the user of the mobile device to select on a sliding scale between "maximum accuracy" of the geofencing experience and "maximum battery life".

In some cases, the mobile device 14 displays on the display 49 a slider button, and the user specifies a desired power level for the algorithm along a range of available power level algorithms (see, FIG. 9). Alternatively, or in addition, the mobile device 14 may display on the display 49 a first user selectable option (e.g. radio button) that corresponds to a lower power algorithm and a second user selectable option (e.g. radio button) that corresponds to the higher power algorithm, and the user specifies whether the lower power algorithm or the higher power algorithm is to be used by selecting either the first user selectable option or the second user selectable option. These are just some example input mechanisms.

In some cases, detection of the geofence crossing uses either the lower power algorithm, the higher power algorithm, or an intermediate power algorithm, wherein the intermediate power algorithm consumes more power from the mobile device 14 than the lower power algorithm (e.g. is a higher power algorithm to the lower power algorithm) and less power from the mobile device 14 than the higher power algorithm (e.g. is a lower power algorithm to the higher power algorithm). In some cases, the user may be allowed to indicate via the user interface of the mobile device 14 whether the lower power algorithm, the intermediate power algorithm or the higher power algorithm is to be used when detecting geofence crossings. It is contemplated that a user specifying whether a lower power algorithm or a higher power algorithm is to be used does not mean that the user must identify a particular lower power algorithm or a particular higher power algorithm. Rather, the user may merely specify a preference along a range of power levels (e.g. see, FIG. 9), and the mobile device 14 and/or building automation server 26 may identified a suitable power algorithm for use during subsequent geofencing. In some cases, the user may be allowed to set a desired tradeoff between geofence performance and battery life of the mobile device 14, which is then used by the mobile device 14 and/or building automation server 26 to identify a suitable power algorithm for use during subsequent geofencing.

In some instances, the mobile device 14 may, sometimes with permission from the user, automatically change from a lower power algorithm to a higher power algorithm if a predetermined abnormality is found to be present in the detected geofence crossing events. For example, the mobile device 14 may change from using a lower power algorithm to a higher power algorithm if a predetermined abnormality is found to be present in the detected geofence crossing events. In one example, a predetermined abnormality that may trigger such an algorithm change may include the detection of more than a threshold number of detected geofence crossing events while the mobile device 14 remains at the user's home (e.g. more than zero detected events). In another example, a predetermined abnormality that may trigger such an algorithm change may include the detection of less than a threshold number of detected geofence crossing events when the user leaves home and goes to work (less than 1 detected event). In some cases, if a predetermined abnormality is found, the mobile device 14 may gain permission from a user via the user interface 48 of the mobile device 14 before changing from a lower power algorithm to a higher power algorithm, or vice-versa.

It is contemplated that the mobile device 14 may determine if one or more predetermined abnormalities are present in the detected geofence crossing events. In some cases, a remote building automation server 26 or the like may determine if one or more predetermined abnormalities are present in the detected geofence crossing events, and the mobile device simply receives from the remote building automation server 26 whether one or more predetermined abnormalities are present in the detected geofence crossing events. In some cases, the mobile device 14 and a remote building automation server 26 or the like may collectively determine if one or more predetermined abnormalities are present in the detected geofence crossing events.

Figure 6:
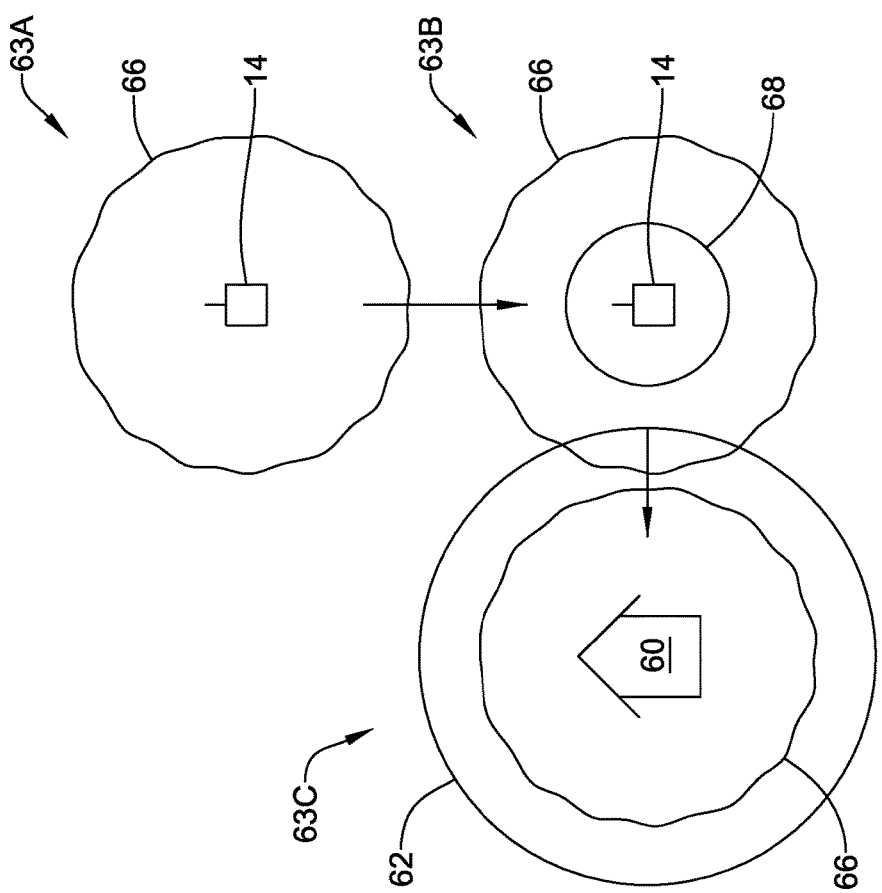
FIG. 6 is a schematic view of an example geofencing scenario.

FIG. 6 is a schematic view of an example geofencing scenario. In the scenario shown, if the user of the mobile device 14 is located in a region with poor cellular triangulation, such as a rural location 63A, but the location is known to be remote from a user's home 60, the user and/or mobile device 14 may elect to use cellular triangulation and conserve battery life of the mobile device 14. Cellular triangulation, especially in a rural location 63A, may have a relatively low horizontal accuracy, such as illustrated by the relative large horizontal accuracy region 66. In FIG. 6, horizontal accuracy region 66 represents a statistical measure of the horizontal accuracy (e.g. within 1 standard deviations) of the location reported by the location services of the mobile device 14.

As the user of the mobile device 14 moves closer to the user's home 60, as shown at 63B, the horizontal accuracy region 66 of the cellular triangulation may cross into the geofence 62. When this occurs, the variability in the location provided by cellular triangulation may result in detection of an inbound geofence crossing event even though the actual location of the mobile device 14 remains well outside of the geofence 62. To help improve the geofencing experience of the user, the user and/or mobile device 14 may elect to switch location services 53 to GPS, which may be more power hungry but may have a smaller horizontal accuracy region 68. In some cases, the user and/or mobile device 14 may temporarily switch location services 53 to GPS in order to confirm or deny whether the inbound geofence crossing event detected using cellular triangulation was in fact a valid inbound geofence crossing event. In FIG. 6, and at location 63B, the GPS determines that the mobile device 14 remains well outside of the geofence 62 of the home and that the inbound geofence crossing event was invalid. Once the user of the mobile device 14 arrives and stays at home 60, as shown at 63C, the user and/or mobile device 14 may switch location services 53 back to cellular triangulation with the larger horizontal accuracy region in order to preserve battery life. This is just one example of a geofence algorithm that provides a balance between power and accuracy.

Figure 7:
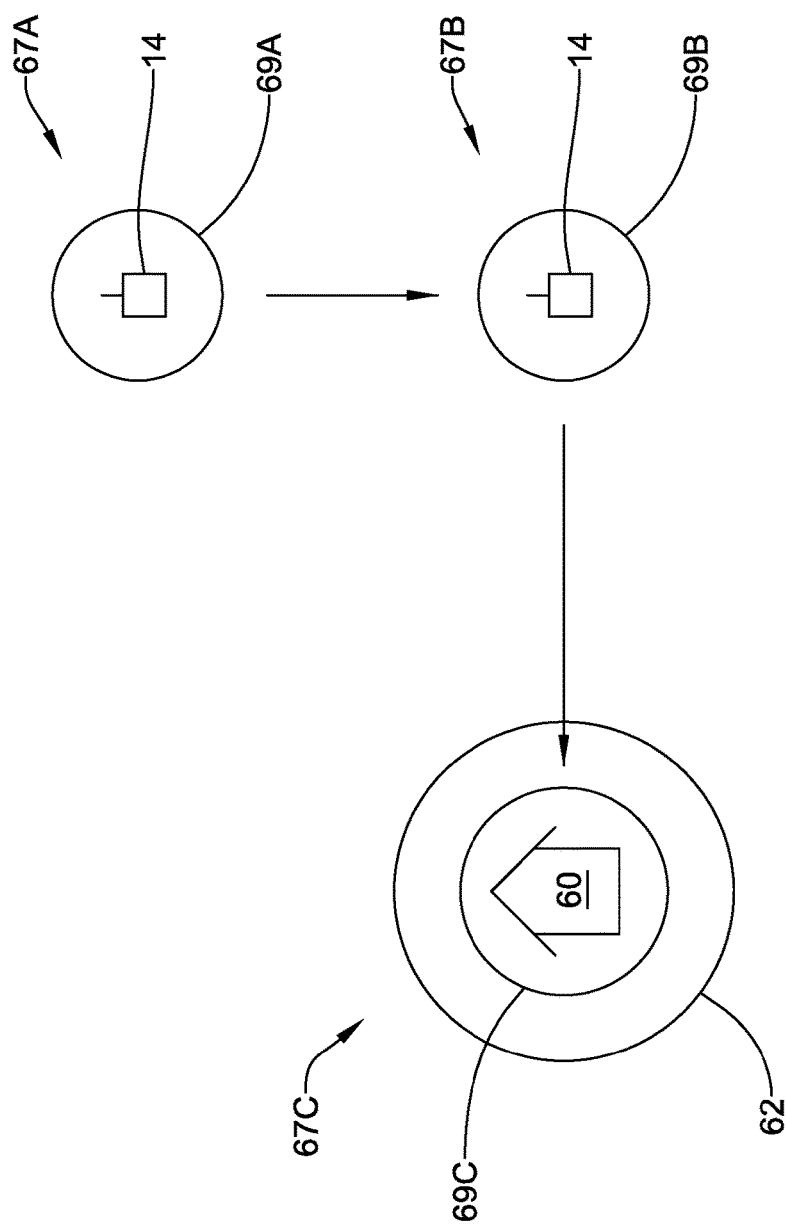
FIG. 7 is a schematic view of another example geofencing scenario.

FIG. 7 is a schematic view of another example geofencing scenario. In this example, if the mobile device 14 is determined to be in a region with poor cellular triangulation, such as at a rural location 67A, the user and/or mobile device 14 may switch location services 53 to GPS. As noted above, GPS may have a relatively small horizontal accuracy region 69A. In this example, it is contemplated that the GPS may be temporarily turned on to detect the current location and to determine if the geofence 62 of the home 60 has been crossed. Then the GPS may be turned off. In FIG. 7, the GPS is turned on at location 67A to determine if the geofence 62 of the home 60 has been crossed. The GPS is then turned off. As can be seen, at location 67A, the geofence 62 of the home 60 has not been crossed. The mobile device 14 then travels to a location 67B, where the GPS is turned on to determine if the geofence 62 of the home 60 has been crossed. The GPS is then turned off. As can be seen, at location 67B, the geofence 62 of the home 60 has not been crossed. Next, the mobile device 14 travels to location 67C, which is at the home 60, and then the GPS is turned on to determine if the geofence 62 of the home 60 has been crossed. The GPS is then turned off. As can be seen, at location 67C, the geofence 62 of the home 60 has been crossed.

The sample rate of GPS readings may be set based on the power versus accuracy setting selected by the user (e.g. see FIG. 9). For example, if the user elects to favor battery life over the geofencing experience, the sample rate of GPS readings may be decreased. The sample rate of GPS readings is an example algorithm setting that may be changed based on the power versus accuracy setting specified by the user.

In some cases, the sample rate of GPS readings may be dynamic. For example, the sample rate of GPS readings may be based on the distance that the mobile device 14 is currently away from the geofence 62 of the home 60. For example, if the mobile device 14 is currently one-half hour from the geofence 62 of the home 60, the sample rate may be set to 1 reading every 20 minutes. If the mobile device 14 is currently five minutes from the geofence 62 of the home 60, the sample rate may be set to 1 reading per minute.

In some cases, the user of the mobile device 14 may be able to select the type of location services 53 based on the current location of the mobile device. For example, for a rural setting, the user of the mobile device 14 may select cellular triangulation to conserve battery life, or the user may select to use a combination of GPS and cellular triangulation, or GPS alone. For an urban setting, the user of the mobile device 14 may select cellular triangulation, perhaps in combination with WiFi Based Positioning (WPS). The mobile device 14 may change the type of location services used based on the current location of the mobile device 14 (e.g. rural settings versus urban setting). In some cases, a rural setting may be identified by predetermined geographic boundaries (e.g. county, city, zip code, etc.) or may be dynamically determined by, for example, monitoring when the horizontal accuracy of cellular triangulation falls below a threshold value.

FIG. 8 is an illustrative query that may be displayed on the mobile device soliciting information from the user of the mobile device regarding whether the user of the mobile device would like to improve geofencing or not improve geofencing. In the example shown, the mobile device 14 (sometimes in combination with a building automation server 26) may determine if the geofence experience is likely to be less than desirable. If so, the mobile device 14 may display the screen 80 on the display 49 of the user interface 48 of the mobile device 14. This screen 80 seeks permission from the user to automatically change the geofencing settings to improve the geofencing experience. One such settings may be to change from a lower power algorithm to a higher power algorithm if a predetermined abnormality is found to be present in the detected geofence crossing events. Other setting changes are also contemplated, including any of those described herein.

FIG. 9 is an illustrative query allowing the user of the mobile device 14 to select on a sliding scale between "maximum accuracy" of the geofencing experience and "maximum battery life". The mobile device 14 may display the screen 90 on the display 49 of the user interface 48 of the mobile device 14, and the user may slide the slider 92 to a desired setting. The mobile device may adjust the algorithm used for geofencing based on the setting selected by the user. For example, if the user slides the slider 92 all the way to the left (maximum accuracy), the mobile device 14 may use the more power hungry Global Position System (GPS) hardware exclusively and continuously to detect geofence crossing events. If the user slides the slider 92 all the way to the right (maximum battery life), the mobile device 14 may use cellular triangulation (CT) or WPS when detecting geofence crossing events, and may not use the more power hungry Global Position System (GPS) hardware at all. If the user moves the slider in between these two settings, the mobile device 14 may use an algorithm for geofencing that strikes the selected balance between accuracy and power.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

The invention claimed is:

1. A non-transitory computer-readable storage medium with an executable program stored thereon, wherein the executable program is configured to instruct a mobile device, having a user interface with a display and location services, to perform the following:
    store information pertaining to a geo-fence, the geo-fence defined by a size about a location;
    with the aid of the location services of the mobile device, detect a geofence crossing when the mobile device crosses the geo-fence, and if a geofence crossing is detected, transmit a geofence crossing event to a remote location via a transmitter of the mobile device;
    wherein the detection of the geofence crossing uses either a lower power geofence detection algorithm or a higher power geofence detection algorithm, wherein the lower power geofence detection algorithm consumes less power from the mobile device than the higher power geofence detection algorithm;
    allowing a user to specify via the user interface of the mobile device whether the lower power geofence detection algorithm or the higher power geofence detection algorithm is to be used when detecting for geofence crossings; and
    using the user specified lower power or higher power geofence detection algorithm when detecting geofence crossings.

2. The non-transitory computer-readable storage medium of claim 1, wherein the location services of the mobile device comprises a Global Position System (GPS).

3. The non-transitory computer-readable storage medium of claim 2, wherein the lower power geofence detection algorithm uses the GPS of the location services of the mobile device.

4. The non-transitory computer-readable storage medium of claim 2, wherein the higher power geofence detection algorithm uses the GPS of the location services of the mobile device.

5. The non-transitory computer-readable storage medium of claim 2, wherein the lower power geofence detection algorithm uses the GPS of the location services of the mobile device, where the GPS is turned on and sampled at a first rate, and the higher power geofence detection algorithm uses the GPS of the location services of the mobile device, where the GPS is turned on and sampled at a second higher rate.

6. The non-transitory computer-readable storage medium of claim 2, wherein the lower power geofence detection algorithm and the higher power geofence detection algorithm both use the GPS of the location services of the mobile device, wherein the lower power geofence detection algorithm turns the GPS on less often than the higher power geofence detection algorithm.

7. The non-transitory computer-readable storage medium of claim 2, wherein the lower power geofence detection algorithm and the higher power geofence detection algorithm both use the GPS of the location services of the mobile device, wherein the lower power geofence detection algorithm obtains a less precise GPS location than the higher power geofence detection algorithm.

8. The non-transitory computer-readable storage medium of claim 6, wherein the lower power geofence detection algorithm obtains a less precise GPS location than the higher power geofence detection algorithm.

9. The non-transitory computer-readable storage medium of claim 1, wherein the mobile device displays on the display a slider button, wherein the user uses the slider button to select a power setting along a sliding scale between a maximum accuracy of the geofencing experience and a maximum battery life of the mobile device, wherein the higher power geofence detection algorithm is used when a user selects a setting that is more toward the maximum accuracy of the geofencing experience relative to when a user selects a setting that is more toward the maximum battery life of the mobile device where the lower power geofence detection algorithm is used.

10. The non-transitory computer-readable storage medium of claim 1, wherein the mobile device displays on the display a first user selectable option that corresponds to the lower power geofence detection algorithm and a second user selectable option that corresponds to the higher power geofence detection algorithm, and the user specifies whether the lower power geofence detection algorithm or the higher power geofence detection algorithm is to be used by selecting either the first user selectable option or the second user selectable option.

11. The non-transitory computer-readable storage medium of claim 1, wherein the detection of the geofence crossing uses either the lower power geofence detection algorithm, the higher power geofence detection algorithm, or an intermediate power algorithm, wherein the intermediate power algorithm consumes more power from the mobile device than the lower power geofence detection algorithm and less power from the mobile device than the higher power geofence detection algorithm, and wherein the user is allowed to specify via the user interface of the mobile device whether the lower power geofence detection algorithm, the intermediate power algorithm or the higher power geofence detection algorithm is to be used when detecting geofence crossings.

12. A non-transitory computer-readable storage medium with an executable program stored thereon, wherein the executable program is configured to instruct a mobile device, having a user interface with a display and location services, to perform the following:
store information pertaining to a geo-fence, the geo-fence defined by a size about a location;
with the aid of the location services of the mobile device, detect a geofence crossing when the mobile device crosses the geo-fence, and if a geofence crossing is detected, transmit a geofence crossing event to a remote location via a transmitter of the mobile device;
wherein the detection of the geofence crossing uses either a lower power geofence detection algorithm or a higher power geofence detection algorithm, wherein the lower power geofence detection algorithm consumes less power from the mobile device than the higher power geofence detection algorithm; and
change from the lower power geofence detection algorithm to the higher power geofence detection algorithm if a predetermined abnormality is found to be present in the detected geofence crossing events.

13. The non-transitory computer-readable storage medium of claim 12, wherein the predetermined abnormality comprises more than a threshold number of detected geofence crossing events while the mobile device remains in the user's home.

14. The non-transitory computer-readable storage medium of claim 12, wherein the predetermined abnormality comprises not detecting one or more geofence crossings.

15. The non-transitory computer-readable storage medium of claim 12, wherein the executable program instructs the mobile device to determine if the predetermined abnormality is present in the detected geofence crossing events.

16. The non-transitory computer-readable storage medium of claim 12, wherein the executable program instructs the mobile device to receive via a receiver of the mobile device if the predetermined abnormality is present in the detected geofence crossing events.

17. The non-transitory computer-readable storage medium of claim 12, wherein the executable program instructs the mobile device to automatically change from the lower power geofence detection algorithm to the higher power geofence detection algorithm if the predetermined abnormality is found to be present in the detected geofence crossing events.

18. The non-transitory computer-readable storage medium of claim 12, wherein if the predetermined abnormality is found to be present in the detected geofence crossing events, the executable program instructs the mobile device to gain permission from a user via the user interface of the mobile device before changing from the lower power geofence detection algorithm to the higher power geofence detection algorithm.

19. A mobile device comprising:
a user interface with a display;
a location service;
a memory for storing information pertaining to a geo-fence, the geo-fence defined by a size about a location;
a transmitter;
a battery;
a controller operatively coupled to the user interface, the location service, the memory, the transmitter, and the battery, the controller configured to:
with the aid of the location service of the mobile device, detect a geofence crossing when the mobile device crosses the geo-fence, and if a geofence crossing is detected, transmit a geofence crossing event to a remote location via the transmitter of the mobile device;
wherein the detection of the geofence crossing uses either a lower power geofence detection algorithm or a higher power geofence detection algorithm, wherein the lower power geofence detection algorithm consumes less power from the battery of the mobile device than the higher power geofence detection algorithm; and change from the lower power geofence detection algorithm to the higher power geofence detection algorithm if a predetermined abnormality is found to be present in the detected geofence crossing events.

20. The mobile device of claim 19, wherein the predetermine abnormality comprises detecting too many geofence crossings and/or detecting too few geofence crossings.

* * * * *